(12) United States Patent
Huang et al.

(10) Patent No.: US 8,152,191 B2
(45) Date of Patent: Apr. 10, 2012

(54) BICYCLE SUSPENSION SYSTEM

(75) Inventors: Hua-Chun Huang, Jhonghe (TW); Owen Chang, Taichung County (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 1210 days.

(21) Appl. No.: 11/398,945

(22) Filed: Apr. 5, 2006

(65) Prior Publication Data

US 2006/0181053 A1    Aug. 17, 2006

Related U.S. Application Data

(63) Continuation-in-part of application No. 10/878,542, filed on Jun. 29, 2004, now Pat. No. 7,566,066.

(30) Foreign Application Priority Data

Apr. 15, 2005 (TW) .............................. 94112066 A
Feb. 10, 2006 (TW) .............................. 95104571 A

(51) Int. Cl.
*B62K 25/26* (2006.01)

(52) U.S. Cl. ........................................ 280/284; 280/275

(58) Field of Classification Search .......... 280/283–296, 280/275; 180/227
See application file for complete search history.

(56) References Cited

U.S. PATENT DOCUMENTS

| | | | |
|---|---|---|---|
| 4,039,200 A | 8/1977 | McGonegle | |
| 5,308,099 A * | 5/1994 | Browning | 280/276 |
| 5,553,881 A | 9/1996 | Klassen et al. | |
| 5,899,480 A | 5/1999 | Leitner | |
| 6,206,397 B1 | 3/2001 | Klassen et al. | |
| 6,386,568 B1 | 5/2002 | Tribotte | |
| 6,488,301 B2 | 12/2002 | Klassen et al. | |
| 6,595,538 B2 | 7/2003 | Ellsworth et al. | |
| 2002/0109332 A1* | 8/2002 | Ellsworth et al. | 280/284 |
| 2003/0234144 A1* | 12/2003 | Fox | 188/278 |
| 2004/0061305 A1* | 4/2004 | Christini | 280/284 |
| 2004/0070169 A1* | 4/2004 | Lesage et al. | 280/284 |
| 2005/0057018 A1* | 3/2005 | Saiki | 280/284 |
| 2005/0067806 A1* | 3/2005 | Weagle | 280/124.1 |
| 2005/0285367 A1* | 12/2005 | Chang et al. | 280/284 |
| 2006/0061059 A1* | 3/2006 | Lesage et al. | 280/284 |

OTHER PUBLICATIONS

Martin, George Henry, Kinematics and Dynamics of Machines, 1982, pp. 69, 70 and 76.

* cited by examiner

*Primary Examiner* — Anne Marie Boehler
(74) *Attorney, Agent, or Firm* — CKC & Partners Co., Ltd.

(57) ABSTRACT

A suspension system may include a front frame connected to a front wheel, a shock absorber pivotally connected to the front frame, and a rear frame connected to a rear wheel supported by a ground contact point. The shock absorber may include a preset pressure substantially equal to a pressure caused by a body weight of a rider. The suspension system may be structurally configured to maintain an instantaneous center point of movement of the rear frame relative to the front frame within an angle range of about 45°±15° relative to the ground contact point when the rear frame moves relative to the front frame.

13 Claims, 13 Drawing Sheets

BICYCLE SUSPENSION SYSTEM

RELATED APPLICATIONS

This application is a continuation-in-part of and claims the benefit of U.S. application Ser. No. 10/878,542, entitled "Bicycle Rear Suspension System," filed on Jun. 29, 2004, which claims priority of Taiwanese Application No. 93110661, filed on Apr. 16, 2004 now U.S. Pat. No. 7,566, 066. This application also claims priority of Taiwanese Application No. 94112066, filed on Apr. 15, 2005, and Taiwanese Application No. 95104571, filed on Feb. 10, 2006. The contents of all the aforesaid patent applications are hereby incorporated by reference.

FIELD OF THE INVENTION

The present invention relates to a shock absorption system. In particular, it relates to a rear suspension shock absorption system for a bicycle.

BACKGROUND OF THE INVENTION

There are a number of indices for evaluating the performance of shock absorption systems in typical bicycle frames. For instance, the efficacy of shock absorption systems can be assessed based upon pedal energy loss, effect of braking on shock-absorption action, smoothness or comfort of shock absorption action, and pedal kickback caused by shock absorption action. In the shock absorption field, the term "kickback" refers to a phenomenon in which a change in chain length subjects the crank and pedals to the force of a rearward tension, thus, causing the rider to experience discomfort.

U.S. Pat. No. 4,039,200 discloses a conventional single swing arm mechanism (alternatively referred to as a "cantilever" system) for absorbing shock. To reduce pedal energy loss in this type of mechanism, the main turning point of a rear triangular frame relative to a front triangular frame is designed to be adjacent to where the chain connects with the front chainwheel. For example, if the front chainwheel cluster is a three-sprocket cluster, the main turning point is designed to be located between the intermediate sprocket and the small sprocket in the area where the chain connects. Alternatively, if the front chainwheel cluster is a two-sprocket cluster, the main turning point is designed to be located where the small sprocket connects to the chain. Finally, if the front chainwheel cluster is a single-sprocket chainwheel, the main turning point is designed to be located where this chainwheel connects to the chain.

This single swing arm system, however, suffers from several drawbacks. For instance, although this system can lower energy loss, it can result in greater pedal kickback, particularly on shock-absorbing frames with long ranges of motion. To reduce pedal kickback, the height of the main turning point must be lowered, thereby resulting in increased pedal energy loss. Moreover, in this system, when a rider is pedaling in a standing position, the compression of the shock absorber may change depending upon the amount of force applied by the rider. Therefore, it is not possible to adequately reduce energy loss during stand-up pedaling.

Other existing rear suspension systems pose similar problems. For example, the rear suspension system disclosed in U.S. Pat. No. 5,899,480 includes a four-bar linkage. In this system, the two turning points adjacent to the fork end are very close to one another, and a virtual pivot point (hereinafter "VPP"), which refers to a rotational axis of the center of the rear wheel during operation of the bicycle, is located slightly behind the pivot point at the front end of the lower fork. Since these points are located relatively close to one another, this system suffers from many of the same drawbacks as the single swing arm mechanism described above. In these systems, pedal energy loss and pedal kickback depend upon several factors. For instance, due to the height of the pivot point at the front end of the lower fork in these systems, it is not possible to achieve both low energy loss and low kickback. Moreover, the instantaneous center point of the rear wheel center relative to the front triangle is lower in these systems than the resultant force line when the rear brakes are applied. When the rear brakes are applied in systems with such a low instantaneous center point, the resultant force will stretch the rear shock absorber, thereby impeding the tension action of the shock absorber.

The system disclosed in U.S. Pat. No. 6,386,568 ("the '568 patent") is also problematic in several ways. For instance, due to the relatively high location of the VPP, the pedaling force may generate tension on the shock absorber over a wide range of circumstances. In the system disclosed in the '568 patent, tension is distributed on the shock absorber when the rider pedals. The shock absorber thus may remain under constant tension. The shock absorber, however, is designed to act only when the force of impact is greater than the tensile force to which the shock absorber is being subjected. As a result, the shock absorber may not be able to absorb small impacts due to the constant tension exerted by the rider during pedaling. Hence, pedaling discomfort may occur.

Moreover, the use of a shock absorber with a "no-sag" setting in the system disclosed in the '568 patent fails to overcome the problem of pedaling discomfort. The term "no-sag setting" refers to a preset internal pressure exerted by the shock absorber that is designed to counteract against the pressure applied to the shock absorber by the body weight of the rider. When a shock absorber has such as no-sag setting, it will not compress when the rider is seated on the saddle.

In addition, the fact that the instantaneous center point of the rear triangular frame relative to the front triangular frame is way out in the front in the system disclosed in the '568 patent causes severe tension of the shock absorber when the rear brake is applied. This tension may further prevent the shock absorber from acting effectively during braking, thereby causing rider comfort levels to drop significantly. Finally, the tension exerted on the shock absorber in this system may unnecessarily reduce the useful life of the shock absorber.

U.S. Pat. Nos. 5,553,881, 6,206,397, and 6,488,301 also disclose four-bar linkage systems. In these systems, the rear wheel path is S-shaped, and the bottom half is a projecting, large chainwheel. During pedaling, the chain tension will pull the rear wheel to a certain point and, thus, achieve the effect of locking the shock absorption mechanism. If this point is designed as a rear wheel center position during a normal sag, then it may be possible to reduce pedaling energy loss. However, if ground surface impacts occur during pedaling, the ground surface impacts may not be effectively absorbed by the shock absorber due to constraints of chain tension. As a result, pedaling comfort may suffer. During stand-up pedaling, a weigh transfer effect may cause the rear wheel center to deviate from an optimal point. This may result in the shock absorption system being unable to effectively reduce energy loss during pedaling. In addition, variation of the distance between the multi-purpose axle connected to the seat tube and the center point of the rear wheel referred to as "RC") variation can be considerable, thereby leading to pedal kickback problems.

In light of the drawbacks of conventional absorption systems, a need exists to provide a bicycle that has a rear suspension shock absorber system, which minimizes energy loss during pedaling in either a sitting or standing position, has minimal braking effects, has low pedal kickback, and is conducive to longer shock absorber life.

SUMMARY OF THE INVENTION

The advantages and purposes of the invention will be set forth in part in the description which follows, and in part will be obvious from the description, or may be learned by practice of the invention. Moreover, the advantages and purposes of the invention will be realized and attained by means of the elements and combinations particularly pointed out in the appended claims.

According to one aspect of the present invention, a suspension system may include a front frame connected to a front wheel, a shock absorber pivotally connected to the front frame, and a rear frame connected to a rear wheel supported by a ground contact point. The shock absorber may include a preset pressure substantially equal to a pressure caused by a body weight of a rider. The rear frame may be structurally configured to maintain an instantaneous center point of movement of the rear frame relative to the front frame within an angle range of about 45°±15° relative to the ground contact point when the rear frame moves relative to the front frame.

According to another aspect of the present invention, a suspension system for a bicycle may include a front frame supported by a front wheel, a shock absorber connected to the front frame, a rear frame supported by a rear wheel having a center point, and a drive assembly connected to the rear frame having at least one chainwheel. The shock absorber may include a predetermined pressure substantially equal to a pressure applied to the shock absorber by a rider of the bicycle assembly. The rear frame may be configured to guide movement of a virtual pivot point, which represents a rotational axis of the center point of the rear wheel, along a path substantially aligned relative to a tangent line extending between the center point of the rear wheel and a tangent point of the chainwheel when the rear wheel moves relative to the front wheel.

The present disclosure further provides a shock absorber for a bicycle assembly. The shock absorber includes a main cylinder, a main piston positioned within the main cylinder, which separates the main cylinder into a first chamber and a second chamber, the first chamber and the second chamber being in fluid communication with each other. The main piston is movable between a first position to a second position, forcing a fluid flowing between the first chamber and the second chamber. The shock absorber further includes an auxiliary cylinder being movable along an outer surface of the main cylinder, an auxiliary piston fixed to the main cylinder and disposed within the auxiliary cylinder, which separates the auxiliary cylinder to a first chamber and a second chamber, and a piston rod connected between the main piston and the auxiliary cylinder. The fluid flow between the first chamber and the second chamber of the main cylinder is restricted when the main piston is at the first position.

In accordance with another aspect of the present invention, an apparatus is provided that, in some embodiments, includes a front triangular frame, a rear triangular frame, a front wheel pivotally provided in a forward direction of the triangular frame, a rear wheel installed in a rear direction of the front triangular frame, and a rearwardly extending suspension system including a shock absorber having a "no-sag setting". The suspension system may be enabled to receive a shock absorbing movement and may be installed between the front triangular frame and the rear wheel. The rear triangular frame may include a main pivot point pivotally connected to the front triangular frame. The main pivot point may be located on or near a resultant force line generated during braking and further located by an angle oscillating within a range of 45°±15°, where the vertex of the angle may be defined as a rear wheel ground contact point with respect to a horizontal ground surface. The apparatus may also include a compression of the shock absorber not exceeding one-seventh of the shock absorption movement.

In accordance with yet another aspect of the present invention, an apparatus is provided that, in some embodiments, may include a front triangular frame, a rear triangular frame, a front wheel pivotally provided in a forward direction of the triangular frame, a rear wheel installed in a rear direction of the front triangular frame, and a rearwardly extending suspension system including a shock absorber having a no-sag setting. The suspension system may be enabled to receive a shock absorbing movement and installed between the front triangular frame and the rear wheel. The rear triangular frame may include a main pivot point pivotally connected to the front triangular frame. The main pivot point may be located on or near a resultant force line generated during braking, and further located by an angle oscillating within a range of 45°±15°, where the vertex of the angle is defined as a rear wheel ground contact point with respect to a horizontal ground surface. The apparatus may also include a compression of the shock absorber that does not exceed one-seventh of the shock absorption movement. An action of the shock absorber may be sensitive to a pedaling action to reduce energy loss. The shock absorber may further include a first oil chamber and a second oil chamber for receiving a pressure fluid, and a piston enabled to move from a first position to a second position, with flow being restricted at the first position. Pressure fluid may flow from the second oil chamber to the first oil chamber wherein the piston may move from the second position to the first position with oil flow being restricted at the first position.

In accordance with still another aspect of the present invention, an apparatus is provided that, in some embodiments, may include a front frame, a front wheel pivotally provided in a forward direction of the front frame, a rear wheel installed in a rear direction of the front frame, a rearwardly extending suspension system installed between the front frame and the rear wheel, a chainwheel, and a VPP substantially aligned with a tangent formed by the center of the rear wheel and the chainwheel. The apparatus may also include moving the VPP rearward as the rear wheel moves upward.

It is to be understood that both the foregoing general description and the following detailed description are exemplary and explanatory only and are not restrictive of the invention, as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE ILLUSTRATIVE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
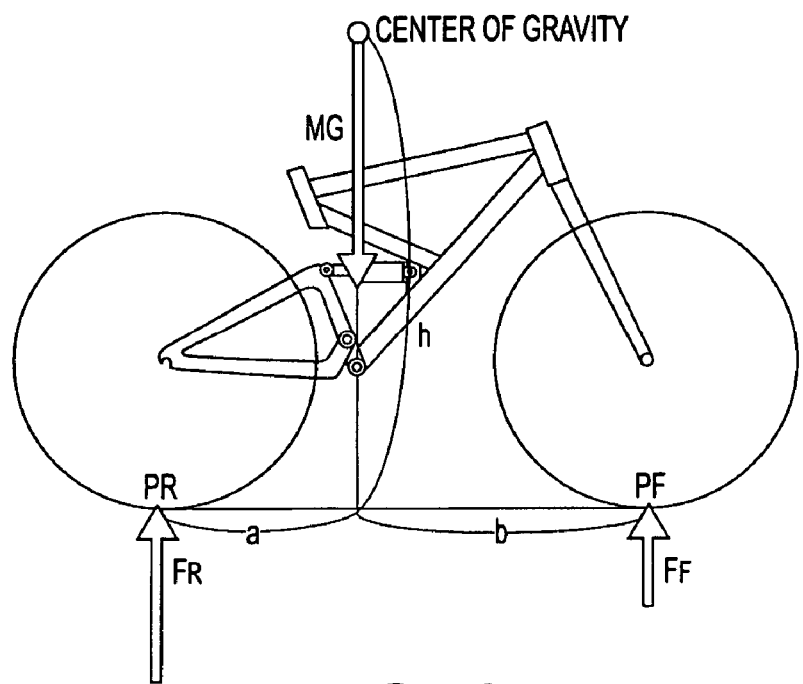
FIG. 1 is a diagram of the forces applied to an existing shock absorption frame before the rear brakes are engaged.

In accordance with one aspect of the present invention, when a rider engages the brakes of a typical bicycle, the performance of a shock absorber system may be affected in several ways. For instance, prior to braking, the situation is as shown in FIG. 1. Before the brakes are engaged, the force ("$F_R$"), which is exerted on the rear wheel of a typical bicycle frame, can be represented by the following equations:

$$\sum M_{PF} = 0;$$

$$F_R \times (a+b) = mg \times b;$$

$$F_R = \frac{b}{a+b} mg;$$

where $M_{PF}$ represents a resultant torque with respect to a front point where the front wheel contacts the ground;

a represents the distance from a rear point where the rear wheel contacts the ground to the center of the gravity of the rider;

b represents the distance from the center of the gravity of the rider to the front point;

m represents the mass of the rider; and g represents the acceleration of gravity.

Figure 2:
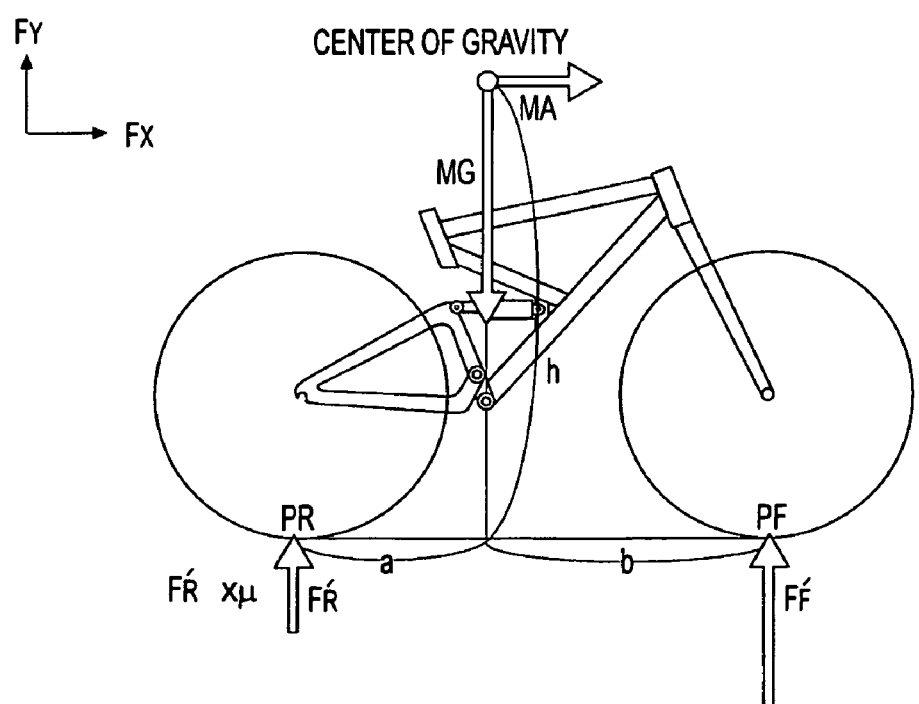
FIG. 2 is a diagram of the forces applied to an existing shock absorption frame after the rear brakes are engaged.

After braking, the situation is as shown in FIG. 2. In this situation, the force ("$F_R'$"), which is exerted on the rear wheel during braking, can be represented by the following equations:

$$\sum F_X = 0, ma = F_R' \times \mu$$

$$\sum M_{PF} = 0$$

$$ma \times h + F_R' \times (a+b) = mg \times b$$

$$F_R' \times \mu \times h + F_R' \times (a+b) = mg \times b$$

$$F_R' = \frac{b}{a+b+\mu \times h} mg$$

Figure 3:
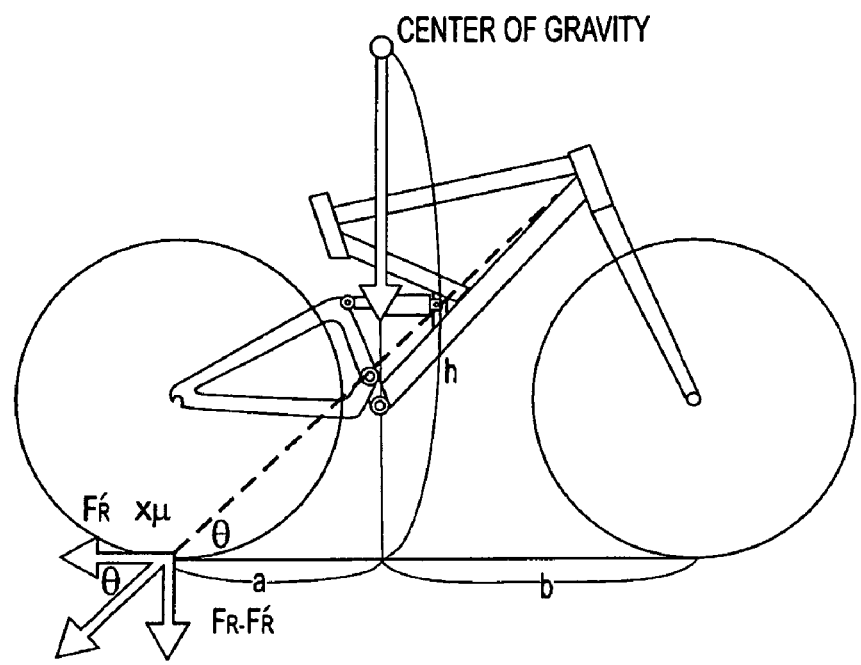
FIG. 3 is a diagram of the resultant force line from rear braking in an existing shock absorption frame.

As illustrated in FIG. 3, the resultant force line angle (referred to as "$\theta$") can then be represented by the following equations:

$$\tan\theta = \frac{F_R - F_R'}{F_R' \times \mu}$$

$$\tan\theta = \frac{\frac{b}{a+b} \times mg - \frac{b}{a+b+\mu \times h} \times mg}{\frac{b \times \mu}{a+b+\mu \times h} \times mg}$$

$$\tan\theta = \frac{\frac{a+b+\mu \times h - a - b}{(a+b) \times (a+b+\mu \times h)}}{\frac{\mu}{a+b+\mu \times h}}$$

$$\tan\theta = \frac{h}{a+b}$$

$$\tan\theta = \frac{h}{wb(\text{wheel base})}$$

Generally speaking, the height of the center of gravity ("h") can be estimated to be approximately equal to the bicycle's wheelbase ("wb"). Based on this estimate, the resultant force line $L_R$ may form roughly a 45° angle relative to a horizontal axis. When the rear suspension system is either a single swing arm, or a four-bar linkage, which has a lower fork connected to the front triangular frame by a single revolving axis, most of the main turning points of the rear suspension system may be located adjacent to, or in alignment with, the resultant force line $L_R$. Locating most of the main turning points in this manner may prevent tension from being applied to the shock absorber when the rear brakes are applied.

With respect to other types of four-bar linkages, the instantaneous center position of the rear triangular frame relative to the front triangular frame may be taken into account. This instantaneous center position is located at the intersection of the line defined by the front and back turning points of the lower connecting bar and the line defined by the turning points of the upper connecting bar. For example, as shown in the exemplary embodiment of FIG. 5, the instantaneous center point O is located at the intersection between a line L1, which extends between the front turning point 21 and the back turning point 22 of the lower connecting bar, and a line L2, which extends between the front turning point 32 and the back turning point 31 of the upper connecting bar. The closer the instantaneous center point O is to the resultant force line $L_R$, the less action there will be that could affect the shock absorber.

In one preferred embodiment of the invention, the instantaneous center point O is substantially aligned with the resultant force line $L_R$. The term "substantially aligned" refers to a preferred range of distances between the instantaneous center point O and the resultant force line $L_R$. In another preferred embodiment of the invention, the distance between the instantaneous center point O and the resultant force line $L_R$ is set to prevent tension from being applied to the shock absorber when the rear brakes are applied. In still another preferred embodiment of the invention, the instantaneous center point O is within a range of ±15° with respect to the resultant force line $L_R$.

In accordance with another aspect of the invention, the term "weight transfer effect" refers to the change in force applied to the shock absorber that is caused by a shift in the center of gravity that occurs when a rider moves between a sitting position and a standing position. Generally speaking, when the rider moves between the sitting and standing positions, the center of gravity shifts, causing a change in the length of the force arm for the center of gravity relative to the shock absorber turning point. The change in the length of the force arm, in turn, causes a change in shock absorber compression. In addition, when the rider performs a pedaling motion while standing, the center of gravity will rise and fall during the pedaling motion because the rider's feet do not apply a uniform force to the pedals during each pedal stroke.

One embodiment of the invention may include a rear suspension shock absorption assembly. The rear suspension shock absorption assembly may include a shock absorber that is sensitive to certain types of forces, such as those produced by a pedaling motion of a rider when the rider is in the sitting and standing positions. The shock absorber may minimize the impact of these types of forces on the efficacy of the suspension shock absorption assembly. Another embodiment of the invention may include a shock absorber having a no-sag setting, where the shock absorber may act with great sensitivity to reduce energy loss. For instance, this feature may improve a comfort level of a rider pedaling on the bicycle assembly. Yet another embodiment of the invention may include a feature that prevents damage to the shock absorber resulting from full compression of the shock absorber. A further embodiment of the invention may include lowering pedaling energy loss and pedal kickback.

Figure 4:
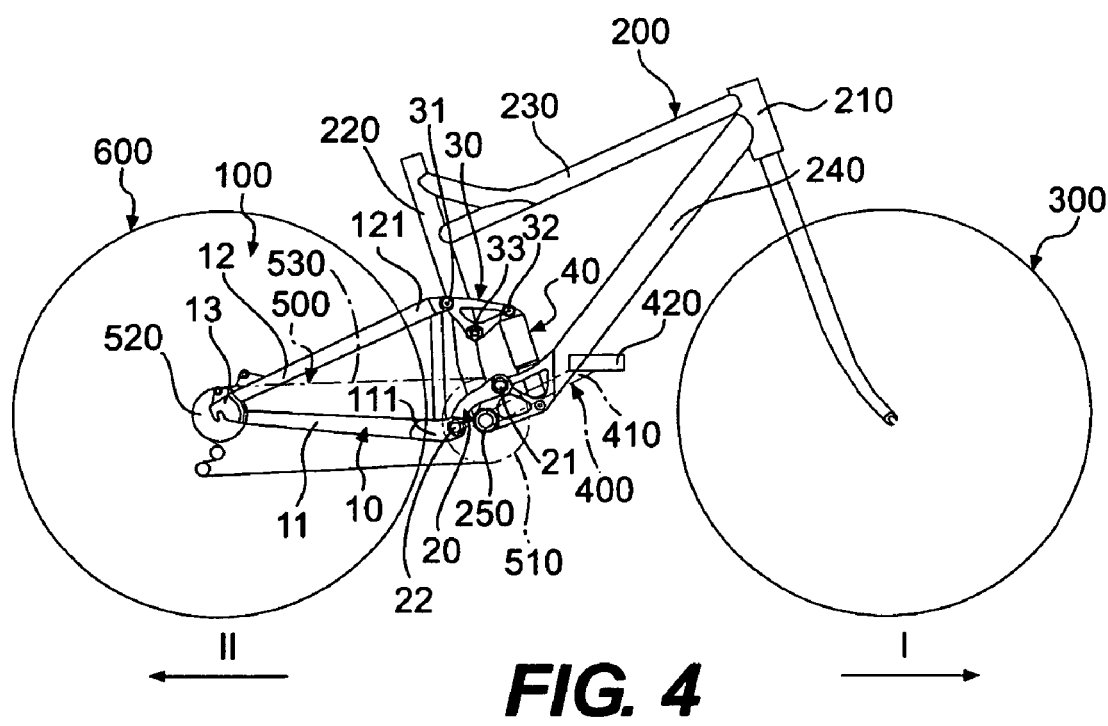
FIG. 4 is a planar diagram that illustrates a first preferred embodiment of the present invention, i.e., a bicycle with rear suspension shock absorption.

FIG. 4 illustrates one embodiment of the present invention that includes a bicycle having a rear suspension shock absorption system. The bicycle may include a rear suspension system 100, a front triangular frame 200, a front wheel 300, a crank unit 400, a drive unit 500, and a rear wheel 600. The front triangular frame 200 may connect to the rear suspension system 100. The front wheel 300 may be installed on the front (forward direction is indicated by arrow I in FIG. 4) of the triangular frame 200. The crank unit 400 may be pivotally provided on the base of the triangular frame 200. The drive unit 500 is adapted to be driven by the crank unit 400. The rear wheel 600 may be located at the rear (backward direction is indicated by arrow II in FIG. 4) of the front triangular frame 200, and installed on the rear suspension system 100.

The front triangular frame 200 may include a head tube 210, a seat tube 220, an upper tube 230, and a lower tube 240. The upper tube 230 may be connected between the head tube 210 and the seat tube 220. The lower tube 240 may be connected between the head tube 210 and the seat tube 220. A multi-purpose axle 250 may be connected to a base of the seat tube 220 and linked to the lower tube 240.

The crank unit 400 may include a crank 410 and two pedals 420 pivotally provided on the two ends of the crank 410. The drive unit 500 may include a chainwheel assembly 510 (alternatively referred to as a "drive" assembly), a rear freewheel cluster 520, and a chain 530. The chainwheel assembly 510 may be connected to the crank unit 400. The rear freewheel cluster 520 may be connected to the rear wheel 600. The chain 530 may be provided around the chainwheel assembly 510 and a rear freewheel cluster 520.

In accordance with one aspect of the invention, the chainwheel assembly 510 may include a single sprocket or multiple sprockets. In describing the preferred ranges of movement of a rotational axis of the center point of the rear wheel, the term "chainwheel" may refer to different things depending on the number of sprockets used. For example, in an embodiment where the chainwheel assembly 510 includes two sprockets, the term "chainwheel" may refer to the virtual intermediate circle 510' that is located concentric to and between the two sprockets. In another embodiment where the chainwheel assembly 510 includes three sprockets, the term "chainwheel" may refer to the intermediate sprockets. In yet another embodiment where the chainwheel assembly 510 includes a single sprocket, the term "chainwheel" may refer to the single sprocket.

The rear suspension system 100 may include a rear triangular frame 10, a lower connecting bar 20, an upper connecting bar 30, and a shock absorber 40. The rear triangular frame 10 may extend in a rear direction II relative to the front triangular frame. Lower connecting bar 20 may pivotally connect between the rear triangular frame 10 and the front triangular frame 200. The upper connecting bar 30 may pivotally connect between the rear triangular frame 10 and the front triangular frame 200 and be further located above the lower connecting bar 20. The shock absorber 40 may pivotally connect between the front triangular frame 200 and the upper connecting bar 30.

The rear triangular frame 10 may include a lower fork 11, an upper fork 12, and a rear fork end 13. The lower fork 11 may correspond to the multi-purpose axle 250 and extend along rear direction II. The upper fork 12 may intersect with the lower fork 11 to form an angle. The rear fork end 13 may be fixedly connected to a connection point wherein the upper fork 12 and the lower forks 11 connect. The lower fork 11 may include a lower fork front end 111 adjacent to the multi-purpose axle 250. The upper fork 12 may include an upper fork front end 121 above the lower fork front end 111.

The lower connecting bar 20 may include a first rotation axis 21 and a second rotation axis 22. The first rotation axis 21 may be pivotally provided on the lower tube 240. The second rotation axis 22 may be disposed opposite to the first rotation axis 21 and pivotally provided on the lower fork front end 111 of the rear triangular frame 10. In addition, the first rotation axis 21 may be located above the multi-purpose axle 250 of the front triangular frame 200 and, in one embodiment, the first rotation axis 21 is located to the side of the multi-purpose axle 250 in forward direction I.

The upper connecting bar 30 may constitute a triangle having a third rotation axis 31, a pivot connection 32, and a fourth rotation axis 33. The third rotation axis 31 may be pivotally provided on the upper fork front end 121 of the rear triangular frame 10. The pivot connection 32 may be disposed opposite to the third rotation axis 31. The fourth rotation axis 33 may be disposed between the third rotation axis 31 and the pivot connection 32 and, in one embodiment, the fourth rotation axis 33 may be pivotally provided on the seat tube 220.

Figure 6:
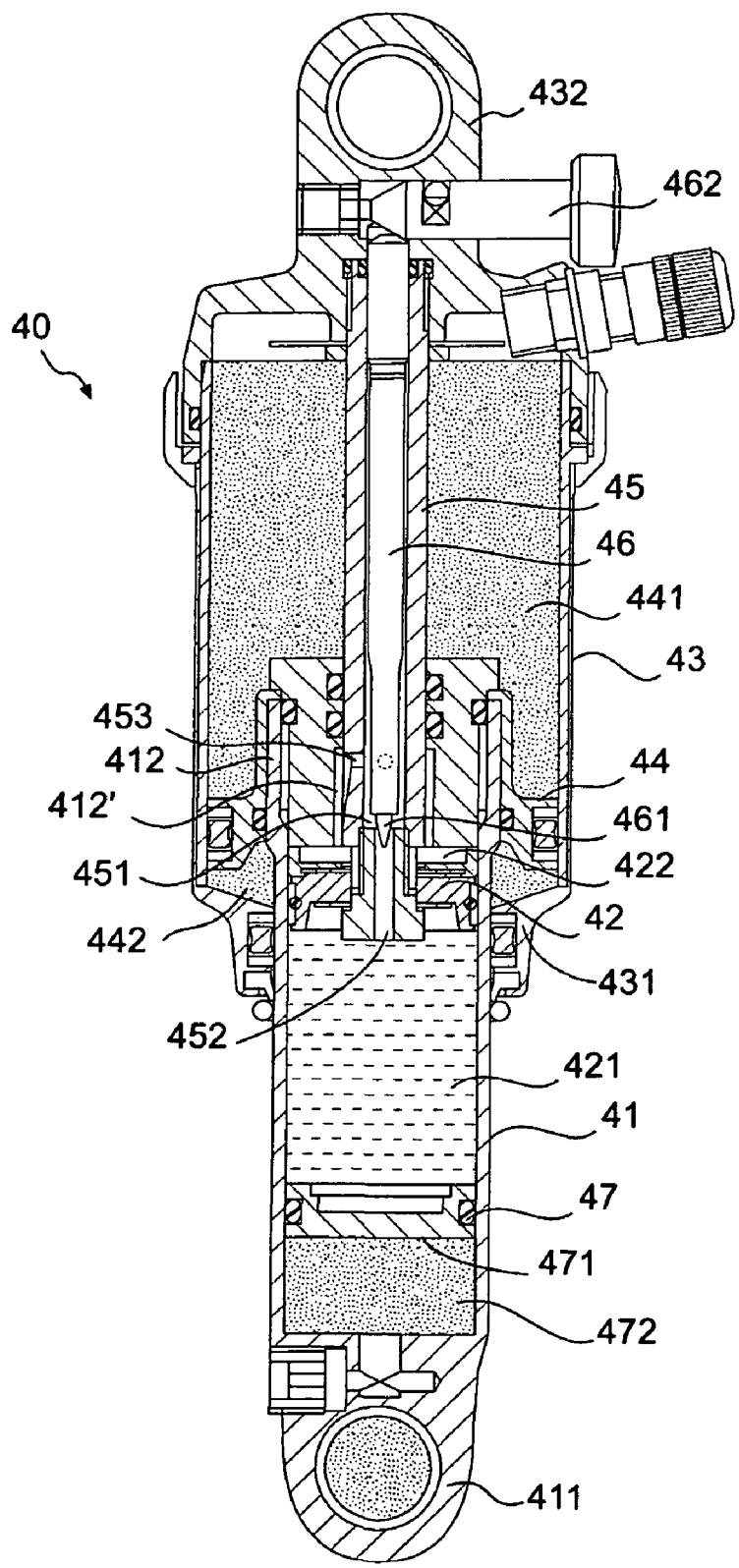
FIG. 6 is a composite, sectional drawing of a shock absorber of the above-described preferred embodiment of the present invention.

With reference to FIG. 6, another embodiment of the invention may include a shock absorber 40 having a main cylinder 41, a main piston 42, an auxiliary cylinder 43, an auxiliary piston 44, a piston rod 45, an adjustable adjustment rod 46, and a restoring unit 47. The main piston 42 may be disposed internally within the main cylinder 41. The auxiliary cylinder 43 may be provided externally around the main cylinder 41. The auxiliary piston 44 may be disposed internally within the auxiliary cylinder 43 and secured to the main cylinder 41. Piston rod 45 may be connected between the main piston 42 and the auxiliary cylinder 43 and extend along an axial line. The adjustable adjustment rod 46 may pass through the inside of the piston rod 45. The restoring unit 47 may provide a rebound force for the main piston 42.

In a preferred embodiment, the shock absorber 40 may have a no-sag setting that controls the amount of compression of the shock absorber 40. Preferably, the no-sag setting limits the amount of compression to approximately one-seventh of a shock-absorption piston stroke. For example, if a shock absorption piston stroke is 38 mm, the amount of compression under the no-sag setting may be from 5.4 mm to 0 mm or 3.8 mm to 0. When there is a small amount of compression, any pedaling force might generate a compression effect on the shock absorber 40. If the compression amount is about zero (0), then substantially no pedaling force may be able to distribute a disabling tension effect upon the shock absorber 40.

The main cylinder 41 may include a base end 411, a top end 412, and a main cylinder wall 413. The base end 411 may be pivotally provided on the lower tube 240 of the front triangular frame 200. Top end 412 may be disposed opposite to the base end 411. The main cylinder wall 413 may be disposed between the base end 411 and top end 412. Moreover, the top end 412 may include a small-diameter portion 412'. And the base end 411 may be located to the side of forward direction I of first rotation axis 21 of the lower connecting bar 20.

In one illustrative embodiment, the piston 42 may be shaped to separate the main cylinder 41 into a first oil chamber 421 (adjacent to the base end 411) and a second oil chamber 422 (near top end 412). The second oil chamber 422 may connect to the small-diameter portion 412', and the area of the cross-section of the second oil chamber 422 may be larger than the small-diameter portion 412'.

In another illustrative embodiment, the auxiliary cylinder 43 may include a cylinder connecting part 431 that fits around the outside of the main cylinder 41. Auxiliary cylinder 43 also may include a pivoting part 432 disposed opposite to the cylinder connecting part 431. The pivoting part 432 may be pivotally connected on the pivot connection 32 of the upper connecting bar 30.

The auxiliary piston 44 may separate the auxiliary cylinder 43 into a positive gas chamber 441 (alternatively referred to as a "first" gas chamber), which may be located near the pivoting part 432 and a negative (or second) gas chamber 442 (alternatively referred to as a "second" gas chamber), which may be located near the cylinder connecting part 431. In a preferred embodiment, the air pressure in the negative gas chamber 442 is preferably the same as the external air pressure (alternatively referred to as "atmosphere" pressure). In addition, because the air pressure of the negative gas chamber 442 may be low, the air pressure of the positive gas chamber 441 also may be similarly low.

In another illustrative embodiment, the piston rod 45 may comprise a hollow tube. The piston rod 45 may include an oil aperture 451 that connects the first oil chamber 421 to the second oil chamber 422. The oil aperture 451 may include a first opening 452 provided on the main piston 42, and a second opening 453 provided on a peripheral surface of the piston rod 45.

The adjustment rod 46 may include a conical part 461 corresponding to the first opening 452 and pulled by a control rod 462 helically mounted on the auxiliary cylinder 43. The adjustment rod 46 may be shifted along an axis to adjust the cross-sectional area of the first opening 452.

The restoring unit 47 may include a spacing plug or piston 471 and a gas-containing space 472. The spacing plug 471 may fit inside the main cylinder 41. The gas-containing space 472 may be formed by the spacing plug 471 and located to one side of the first oil chamber 421. In one embodiment, the gas-containing space 472 may be filled with high-pressure nitrogen.

Figure 5:
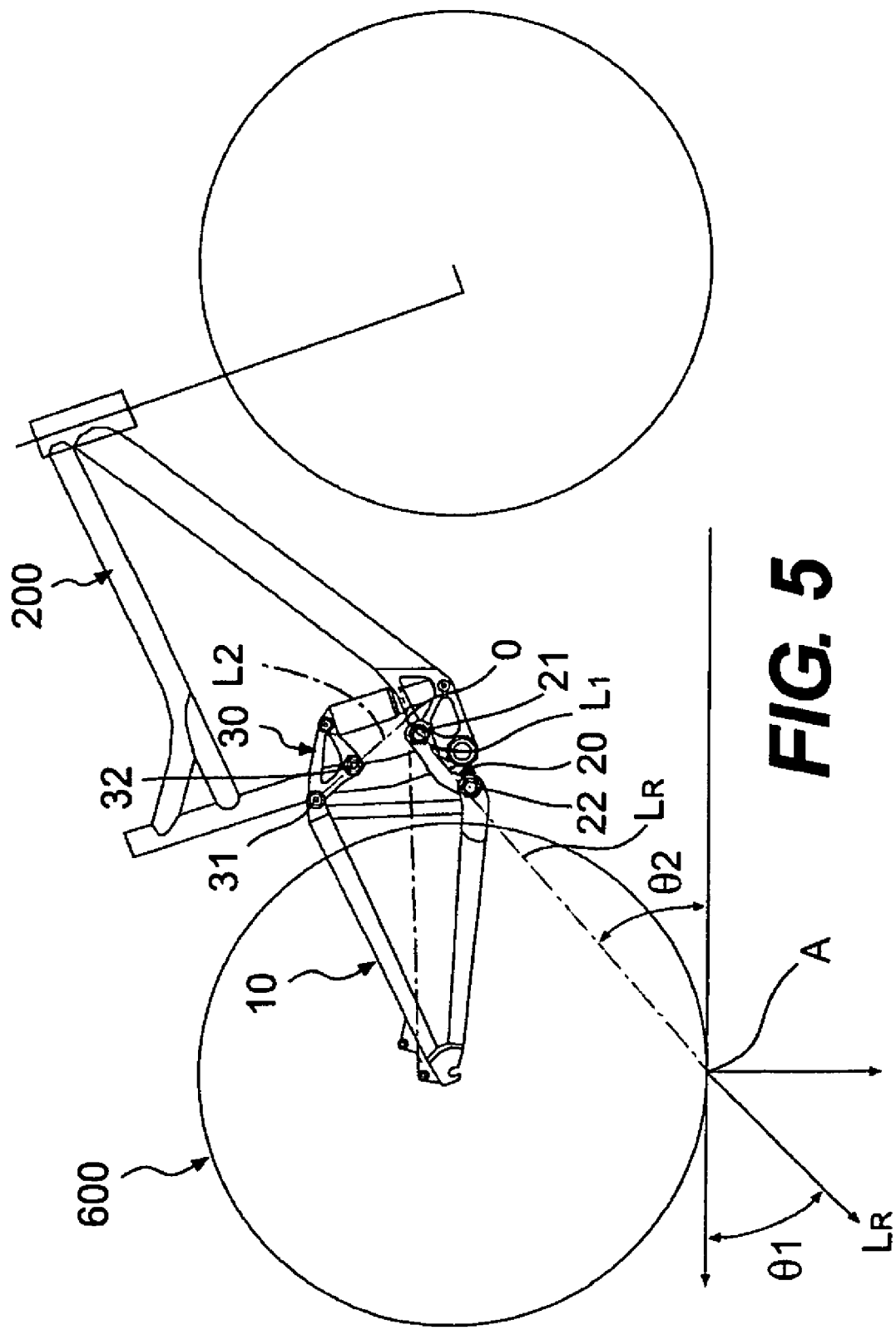
FIG. 5 shows how an angle formed by the line passing through the instantaneous center point and the rear wheel-ground contact point and a horizontal line corresponds to the resultant force line in a preferred embodiment.

In the above-described rear suspension system 100 illustrated in FIG. 5, the instantaneous center point O of the rear triangular frame 10 relative to the front triangular frame 200 may be substantially aligned with an intersection point between a first straight line L1, which passes through the first rotation axis 21 and the second rotation axis 22 of the lower connecting bar 20, and a second straight line L2, which passes through the third rotation axis 31 and the fourth rotation axis 33 of the upper connecting bar 30. In one preferred embodiment, the angle $\theta_2$ is formed by the instantaneous center point O and the point A where the rear wheel 600 meets the ground. In another preferred embodiment, the angle $\theta_2$ is approximately 40°. In still another preferred embodiment, this angle $\theta_2$ is within the range of angles $\theta_1$ formed by the ground surface at the point A and the line of resultant force $L_R$ generated when the rear wheel 600 brake is applied. Therefore, it is possible to minimize the shock effects caused by the rear wheel brake. In a further preferred embodiment, the angle $\theta_1$ is approximately 45°±15°. In yet another preferred embodiment, the angle $\theta_1$ may be within either the range of 40°-50°, or the range of 35°-45°.

As illustrated in FIG. 6, when a rider is sitting on the saddle and pedaling, and when the shock absorber has a no-sag setting, substantially no force may be distributed to the shock absorber 40 to cause it to inadvertently compress or extend. This can prevent the shock absorber 48 from being disabled by such a force, and reduce a loss of pedaling energy. At this point, the main piston 42 corresponds to the main cylinder 41 and is located at the first position shown in FIG. 6. The second opening 453 of the oil aperture 451 corresponds to the small-diameter portion 412' of the main cylinder 41. The auxiliary piston 44 also corresponds to the auxiliary cylinder 43 and is located at the lowest position.

Figure 7:
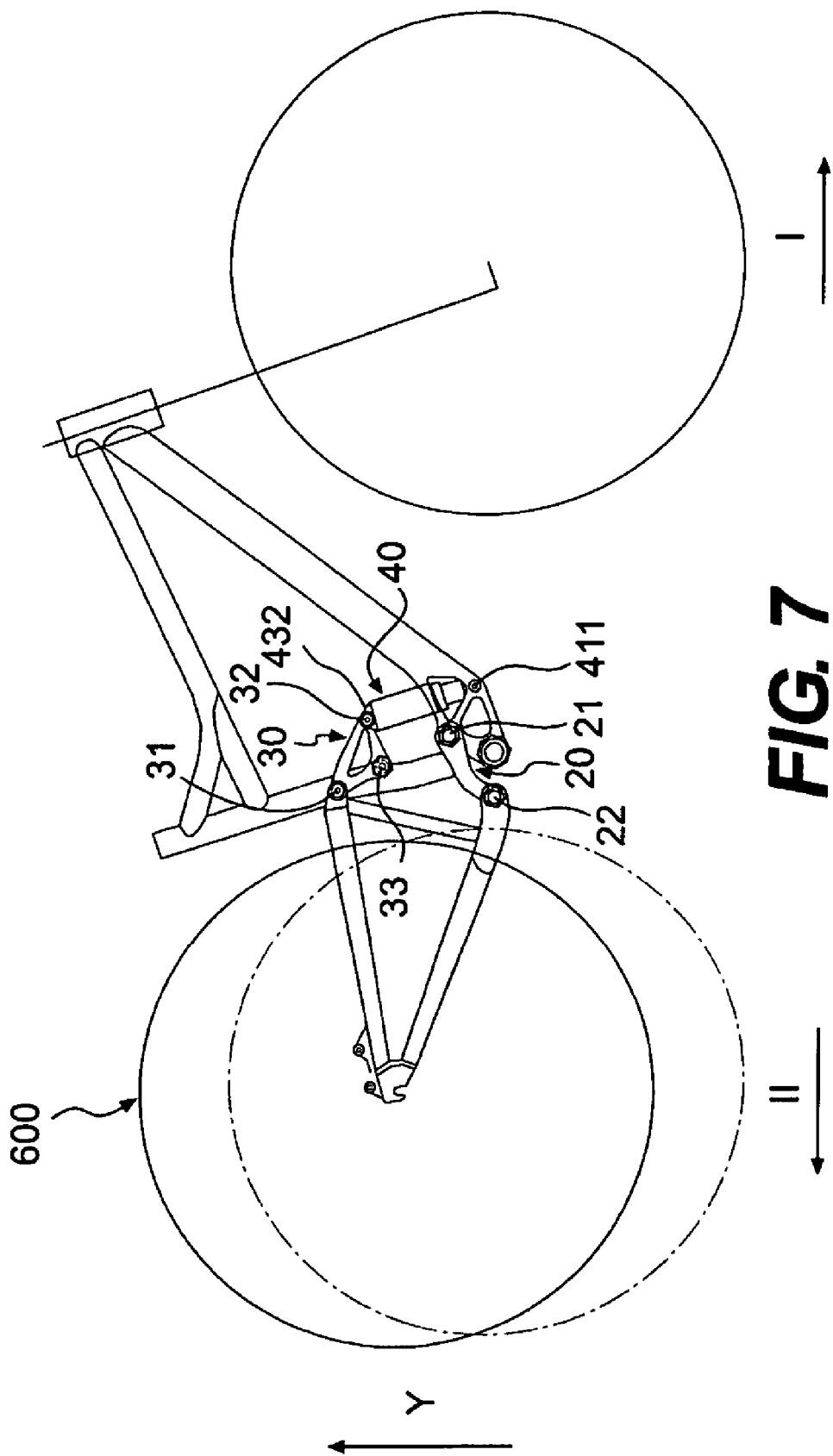
FIG. 7 is a rear wheel action diagram of the above-described preferred embodiment of the present invention, illustrating how shocks to the rear wheel compress in an upward direction and drive an upper and a lower connecting bar to generate a pivoting action in the same direction.

As further shown in FIG. 7, the rear wheel 600 may gradually swing upward towards the Y direction, such as when the traveling bicycle encounters uneven ground. In this embodiment, the second rotation axis 22 of the lower connecting bar 20 may undergo a revolving shift in a clockwise direction from the rear direction II toward a direction of the forward direction I. As the second rotation axis 22 undergoes the revolving shift, the first rotation axis 21 may act as the center of revolution. The third rotation axis 31 of the lower connecting bar 30 also may undergo a revolving shift in a clockwise direction) from the rear direction II towards a direction of the forward direction I. As the third rotation axis 31 undergoes the revolving shift, the fourth rotation axis 33 may act as the center of revolution.

Figure 8:
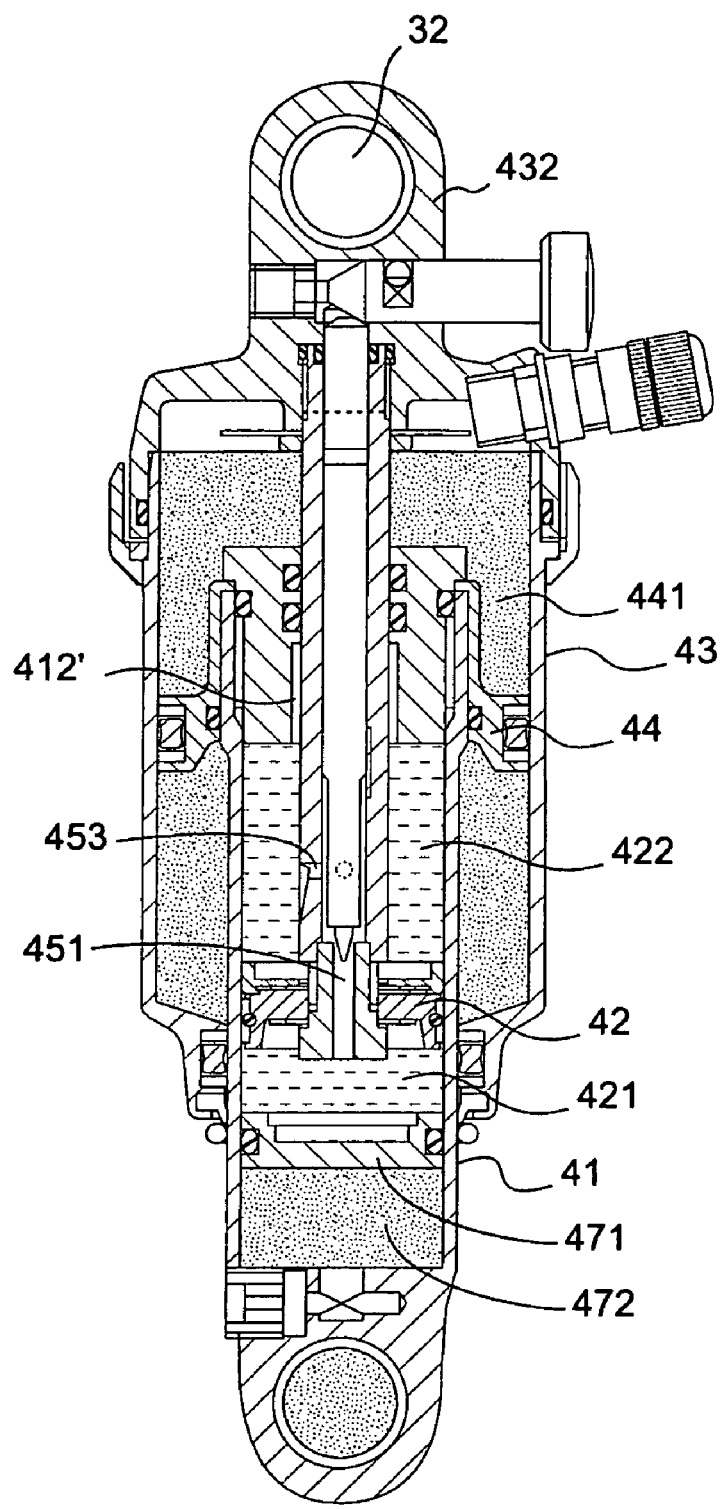
FIG. 8 is an action diagram of the shock absorber of the above-described preferred embodiment of the present invention, illustrating how the piston moves from the first position to a second position.

As shown in the embodiment of FIG. 8, a pivot connection 32 may be used to drive pivoting part 432 of the auxiliary cylinder 43, causing it to compress relative to the main cylinder 41. When the pivoting part 432 is compressed, pressure fluid flows from the first oil chamber 421 to the second oil chamber 422. The main piston 42 then moves from the first position illustrated in FIG. 6 toward the second position near the spacing plug 471 illustrated in FIG. 8. Due to the difference between the small-diameter portion 412' and the cross-section area of the second oil chamber 422, when the second opening 453 of the oil aperture 451 is located within the small-diameter portion 412' (the main piston at the first position), flow restriction occurs, and the main piston gradually increases in speed from the first position to the second position. At this point, the auxiliary cylinder 43 is being pressed closer to the main cylinder 41. As a result, the auxiliary piston 44 moves from the lowest position to a higher position and compresses the high-pressure gas in the main gas chamber 41. Additionally, the high-pressure nitrogen inside the gas-containing space 472 may be compressed by the spacing plug 471. In other words, in the moment that the shock occurs, the main piston 42 is used at the first position illustrated in FIG. 6 to cause flow restriction and to effect a buffering action.

Then, when the force of the shock applied to the pivoting part 432 of the auxiliary cylinder 43 vanishes, the high-pressure gas of the positive gas chamber may act to produce a rebound effect within the gas-containing space 472. The auxiliary cylinder 43 and the spacing plug 471 can rebound to the positions shown in FIGS. 6 and 8, for example. In addition, the piston 42 may shift back from the second position to the first position, and the pressure fluid may be caused to flow from the second oil chamber 422 to the first oil chamber 421. Moreover, as a result of the difference in cross-sectional area of the second oil chamber 422 and the small-diameter portion 412', when the second opening 453 of the oil aperture 451 corresponds to the small-diameter portion 412', flow restriction may be effected. The movement of the main piston 42 gradually slows as it moves from the second position towards the first position. In this way, it is possible to prevent the shock absorber 40 from rebounding and the auxiliary piston 44 from striking the auxiliary cylinder 43. Thus, the service life of the shock absorber 40 may be extended.

In another embodiment, the gas pressure in the negative gas chamber 442 of the shock absorber 40 is preferably low. The gas pressure of the positive pressure chamber 441 may be correspondingly low. This may reduce manufacturing costs since precision and air tightness requirements may be reduced. In addition, the low gas pressure of positive gas chamber 441 can ensure a greater level of comfort. And by using the control rod 462, the cross-section area between the conical part 461 and the first opening 452 can be adjusted to adjust buffer performance when appropriate.

Figure 9A:
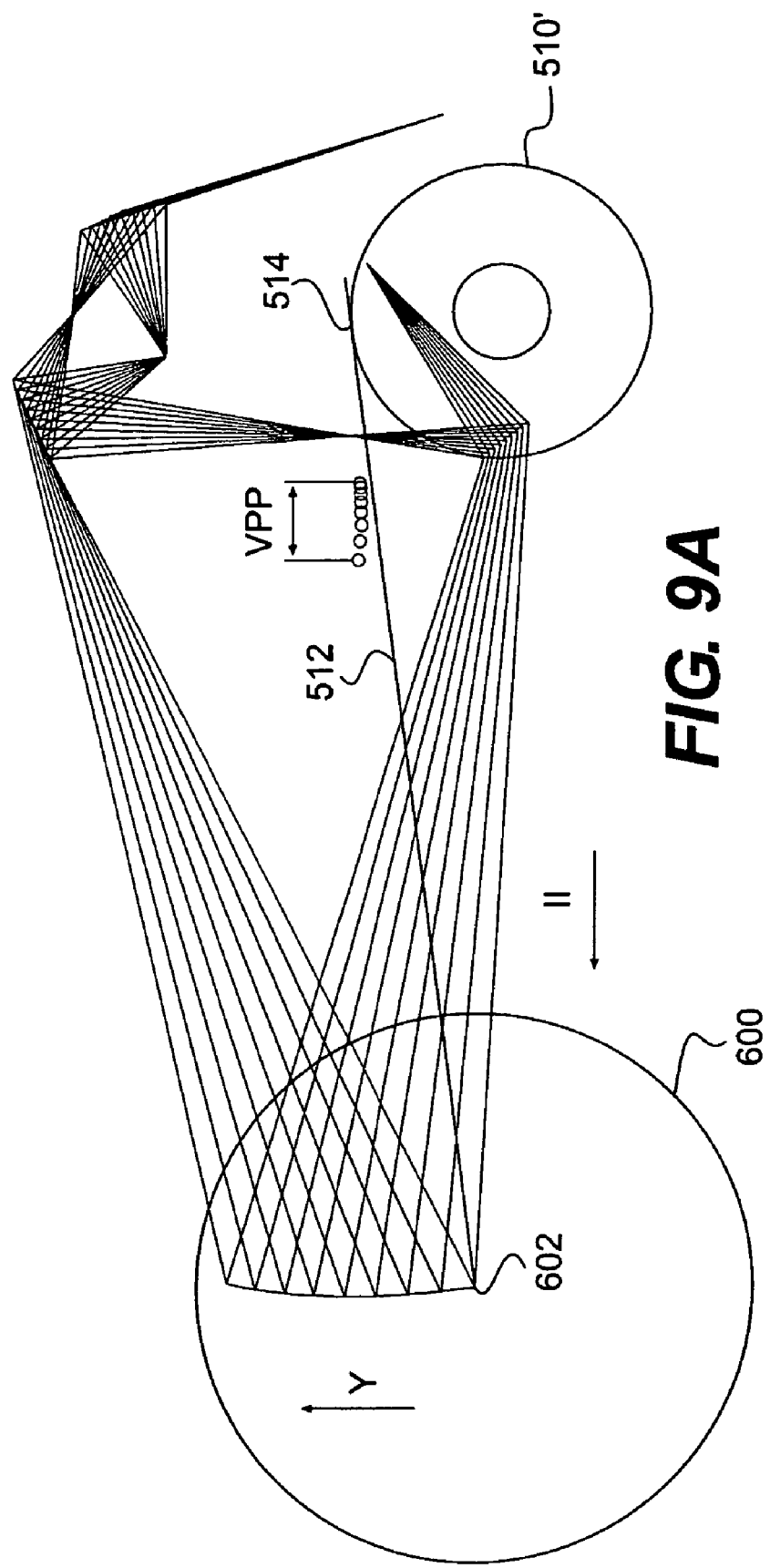
FIG. 9A is a distribution diagram of the virtual pivot point of one preferred embodiment of the present invention.
Figure 9B:
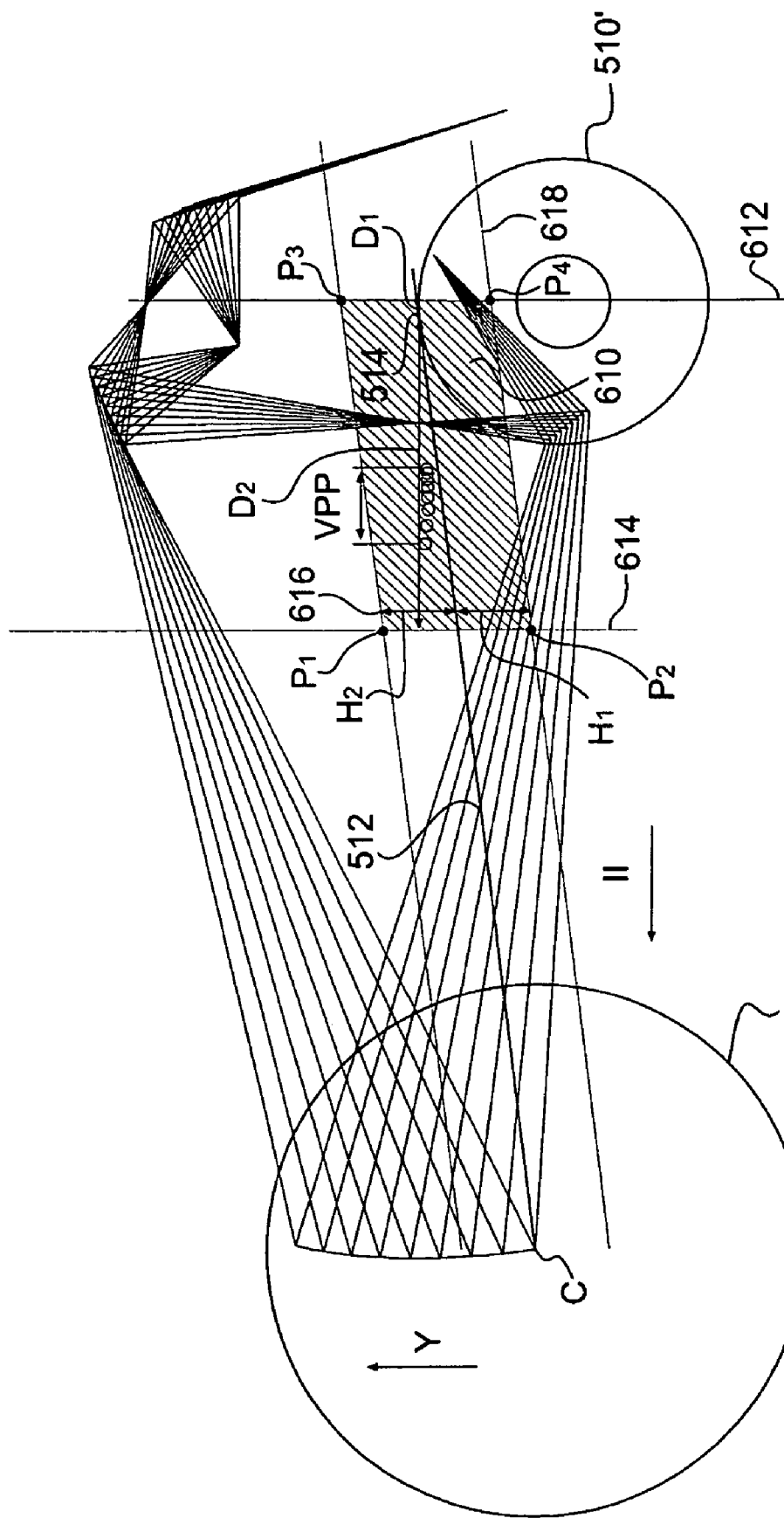
FIG. 9B is a distribution diagram of the virtual pivot point of another preferred embodiment of the present invention.
Figure 9C:
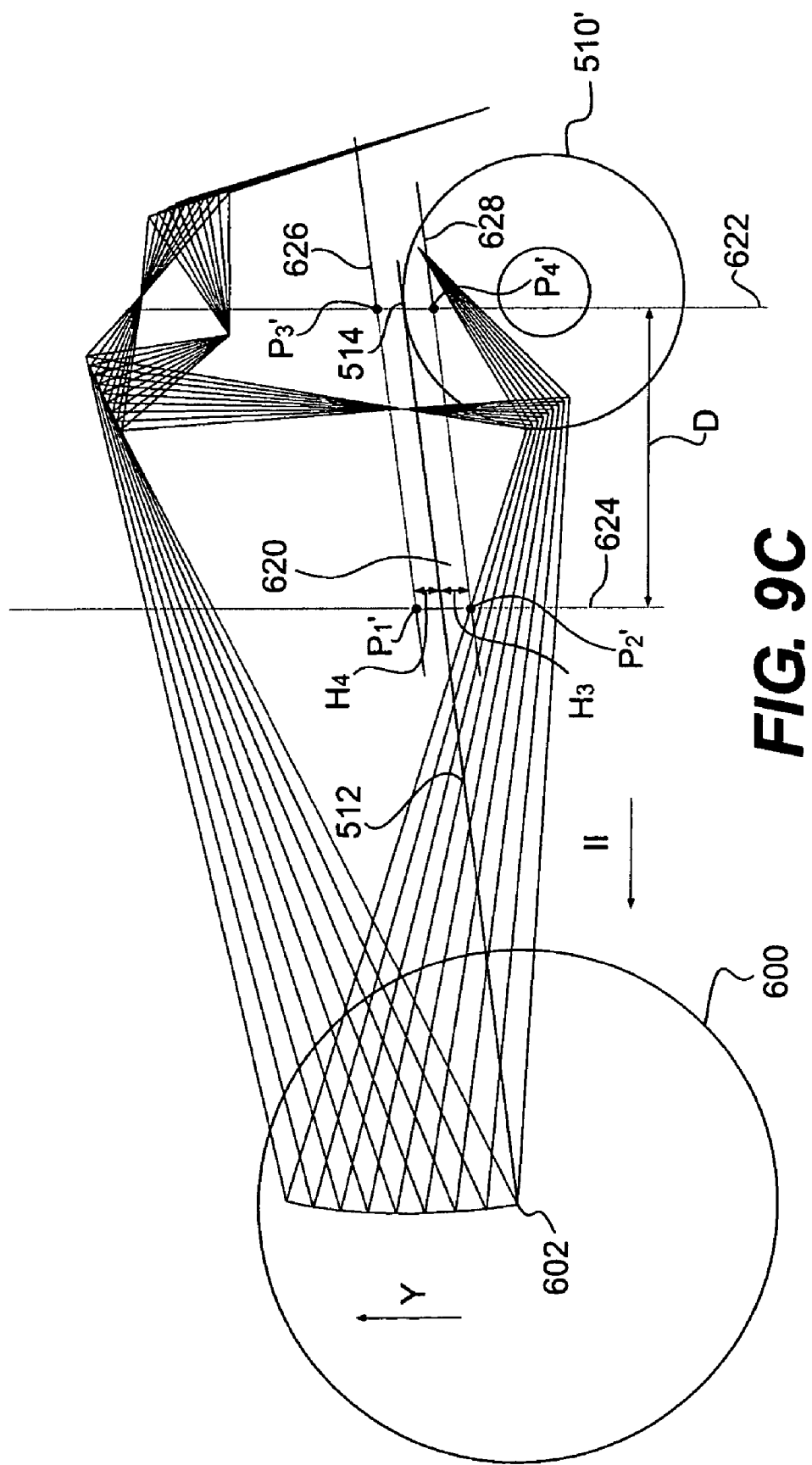
FIG. 9C is a distribution diagram of the virtual pivot point of a further preferred embodiment of the present invention.

As further shown in FIGS. 4 and 9A-C, when a pedaling force is applied to a pedal 420, the tension on chain 530 and the weight rotation of a rider may distribute a force to the rear fork end 13. This force may be applied in different directions, for instance, depending on the gear ratio. When the VPP is located on the mean of all lines of applied force, a smaller amount of pedaling energy loss occurs. In one embodiment, the VPP is substantially aligned with a tangent line extending from the center 602 of the rear wheel 600 to a chainwheel 510 when a rider is in a normal position and when the shock absorber has a zero sag setting. FIGS. 9A-C illustrate the range of movement of the VPP under different circumstances. For instance, as the rear wheel 600 continues to swing upwards in the Y direction, e.g., away from the ground surface, the VPP will extend in the direction II. It is thus possible to reduce the pedal kickback effect caused when the shock absorber is acting. In one embodiment, the VPP is on or near a tangent line 512 of a rear wheel center 602 and a chainwheel 510. The range of movement of the VPP can be defined by reference to the tangent point 514 and the tangent line 512 from the rear wheel center 602 to the chainwheel 510.

As illustrated in the embodiment of FIG. 9B, the range of movement of the VPP may fall within an area 610. The area 610 may be bounded by a first vertical line 612, a second vertical line 614, upward and downward deviation distances $H_1$, $H_2$ relative to the tangent line 512, an upper line 616, and a lower line 618. The upward deviation distance $H_1$ may extend to a first deviation point $P_1$, which is located on the second vertical line 614 and is spaced above the tangent line 512. Similarly, the downward deviation distance $H_2$ may extend to a second deviation point $P_2$, which is located on the second vertical line 614 and is spaced below the tangent line 512. The area 610 also may be bounded by a third deviation point $P_3$, which is located on the first vertical line 612 and is spaced above the tangent line 512, and a fourth deviation point $P_4$, which is located on the first vertical line 612 and is spaced below the tangent line 512. The upper line 616 may extend along a direction parallel to the tangent line 512 and may extend between the first and third deviation points $P_1$ and $P_3$. Similarly, the lower line 618 may extend between the second and fourth deviation points $P_2$ and $P_4$. The tangent point 514 may be spaced by a distance $D_1$ from the first vertical line 612 extending through a center point C of the chainwheel 510. The second vertical line 614 may be spaced from the tangent point 514 by a distance $D_2$. In one illustrative embodiment, the distance $D_1$ is about 10 mm, the distance $D_2$ is about 300 mm, the upward and downward deviation distances $H_1$, $H_2$ are 55 mm, respectively, and the two parallel lines 616, and 618 may extend along a direction substantially parallel to the tangent line 512.

As illustrated in the embodiment of FIG. 9C, the range of movement of the VPP may fall within an area 620. The area 620 may be bounded by a first vertical line 622, which intersects with the tangent point 514, a second vertical line 624, upward and downward deviation distances $H_3$, $H_4$ relative to the tangent line 512, an upper line 626, and a lower line 628. The upward deviation distance $H_3$ may extend to a first deviation point $P'_1$, which is located on the second vertical line 624 and is spaced above the tangent line 512. Similarly, the downward deviation distance $H_4$ may extend to a second deviation point $P'_2$, which is located on the second vertical line 624 and is spaced below the tangent line 512. The area 620 also may be bounded by a third deviation point $P'_3$, which is located on the first vertical line 622 and is spaced above the tangent line 512, and a fourth deviation point $P'_4$, which is located on the first vertical line 622 and is spaced below the tangent line 512. The upper line 626 may extend between the first and third deviation points $P'_1$ and $P'_3$. Similarly, the lower line 618 may extend between the second and fourth deviation points $P'_2$ and $P'_4$. In one illustrative embodiment, the distance D is about 150 mm, the upward and downward deviation distances $H_3$, $H_4$ are 20 mm, respectively, and the two parallel lines 626, 628 may extend along a direction substantially parallel to the tangent line 512. By way of further illustration, the embodiments of the present invention may provide at least the following exemplary functions:

I. Minimize pedaling energy loss: The VPP is made to fall near or on the tangent defined by the rear wheel center and the front chainwheel. Therefore, the system can effectively reduce torque generated by chain tension during pedaling on the VPP, thus minimizing the compression of the shock absorber 40.

II. Efficient Shock Absorption: As a result of the no-sag setting of the shock absorber 40, when a rider is sitting on the saddle and pedaling, the shock absorber 40 may not act or may act only slightly. Thus, the objective of low energy loss is achieved. However, when the bicycle hits a bump or a hole, it can respond quickly.

III. Shock Absorption Based on Rider Position: Because of the weight transfer effect, when a rider pedals while standing, the force applied by the rider to the shock absorber 40 is different from the force applied while the rider is sitting. If there is no-sag setting, the shock absorber 40 will engage in less shock absorption action when the rider applies a pedaling force and when the bicycle strikes an object on the road than would be the case if the bicycle had a sag setting shock absorption design. Thus, it is possible to greatly reduce energy loss during pedaling while standing.

IV. Minimize Impact of Braking on Shock Absorption: Because the instantaneous center point O of the rear triangular frame 10 relative to the front triangular frame 200 is within the 45°±15° sector whose vertex is the point where the rear wheel meets the ground and whose horizontal line is the ground surface, the shock effects caused by rear wheel braking can be minimized.

V. Minimizing Pedal Kickback: Since the pedal kickback phenomenon may be caused by changes in chain length during shock absorber action, the change in RC may be modified so that it approximates the change in chain length. The pedal kickback phenomenon can thus be minimized.

VI. Providing a Shock Absorber with a No-Sag Setting Feature: Since a shock absorber 40 may be provided with a positive gas chamber 441 that has a certain level of preset internal pressure, the shock absorber 40 may have a no-sag setting feature. When this preset pressure in the gas chamber 441 is high, the shock absorber 40 preferably may have a very solid design, and it may not respond too quickly. As the equation, $Pp=Np+F$ ($Pp$=gas pressure of the positive gas chamber; $Np$=gas pressure of the negative gas chamber; $F$=the force applied by the weight of the rider) makes clear, the goal of reducing pressure in the positive gas chamber 441 can be achieved by reducing pressure in the negative gas chamber 442. When pressure in the negative gas chamber 442 is relatively low, perhaps as low as the external pressure, it is possible to achieve the ideal pressure of the positive pressure chamber 441.

However, when pressure in the negative gas chamber 442 is low, the result is that the shock absorber 40 tends to rebound to its limit. And when the shock absorber piston stroke reaches its limit, the moving parts of the shock absorber 40 strike each other and tend to be damaged. Therefore, the shock absorber 40 makes use of a hydraulic top out bumper, which can generate a buffering effect when the rebound stroke of the shock absorber piston is about to reach its limit and, thus, can extend the life of the shock absorber. Of course, this solution does not have to make use of hydraulics. Any material or method that can achieve an elastic buffering effect can achieve the same results.

Figure 10:
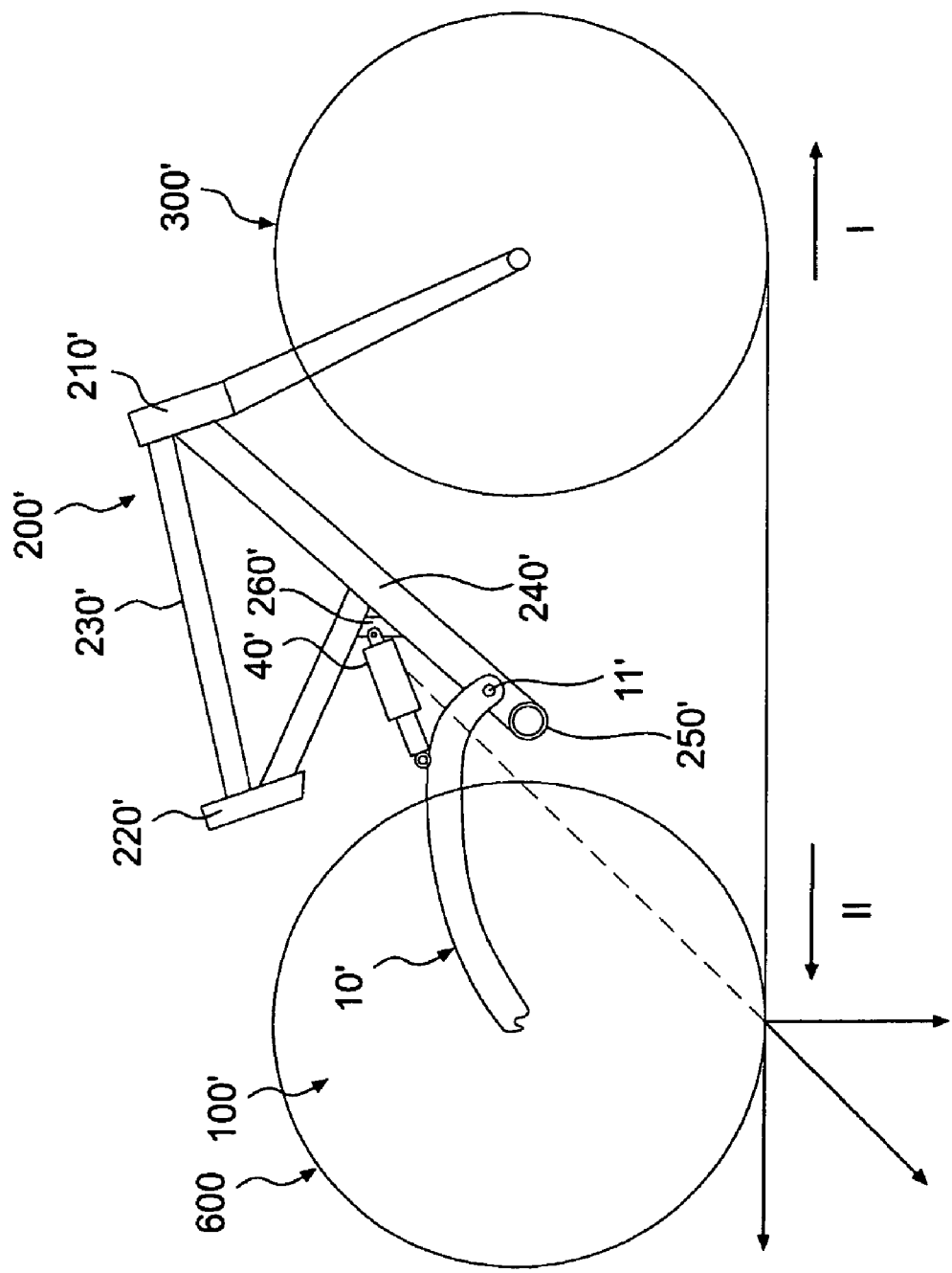
FIG. 10 is a planar diagram of a second embodiment of a bicycle having rear suspension shock absorption.

As further shown in FIG. 10, a second embodiment of the present disclosure is similar to the above-described embodiments. This embodiment includes a rear suspension system 100', a front triangular frame 200' pivotally connected to the rear suspension 100', a front wheel 300' installed on the front (a forward direction is indicated by the arrow I in FIG. 10) of the front triangular frame 200', and a rear wheel 600' corresponding to the front wheel 300' and located in the rear (a backward direction is indicated by arrow II in FIG. 10) of the front triangular frame 200' and installed on the rear suspension system 100'.

The front triangular frame 200' may include a head tube 210', a seat tube 220', an upper tube 230' connected between the head tube 210' and the seat tube 220', a lower tube 240' connected between the head tube 210' and the seat tube 220' and below the upper tube 230', a multi-purpose axle 250' connected to a base of the lower tube 240', and a pivot post 260' relative to the seat tube 220' and disposed above the multi-purpose axle 250'. The rear suspension system 100' includes a rear triangular frame 10' pivotally connected on the pivot post 260', and a shock absorber 40' pivotally connected between the front triangular frame 200' and the rear triangular frame 10'.

The rear triangular frame 10' may include a main pivot point 11' pivotally connected above the multi-purpose axle 250'.

Figure 11:
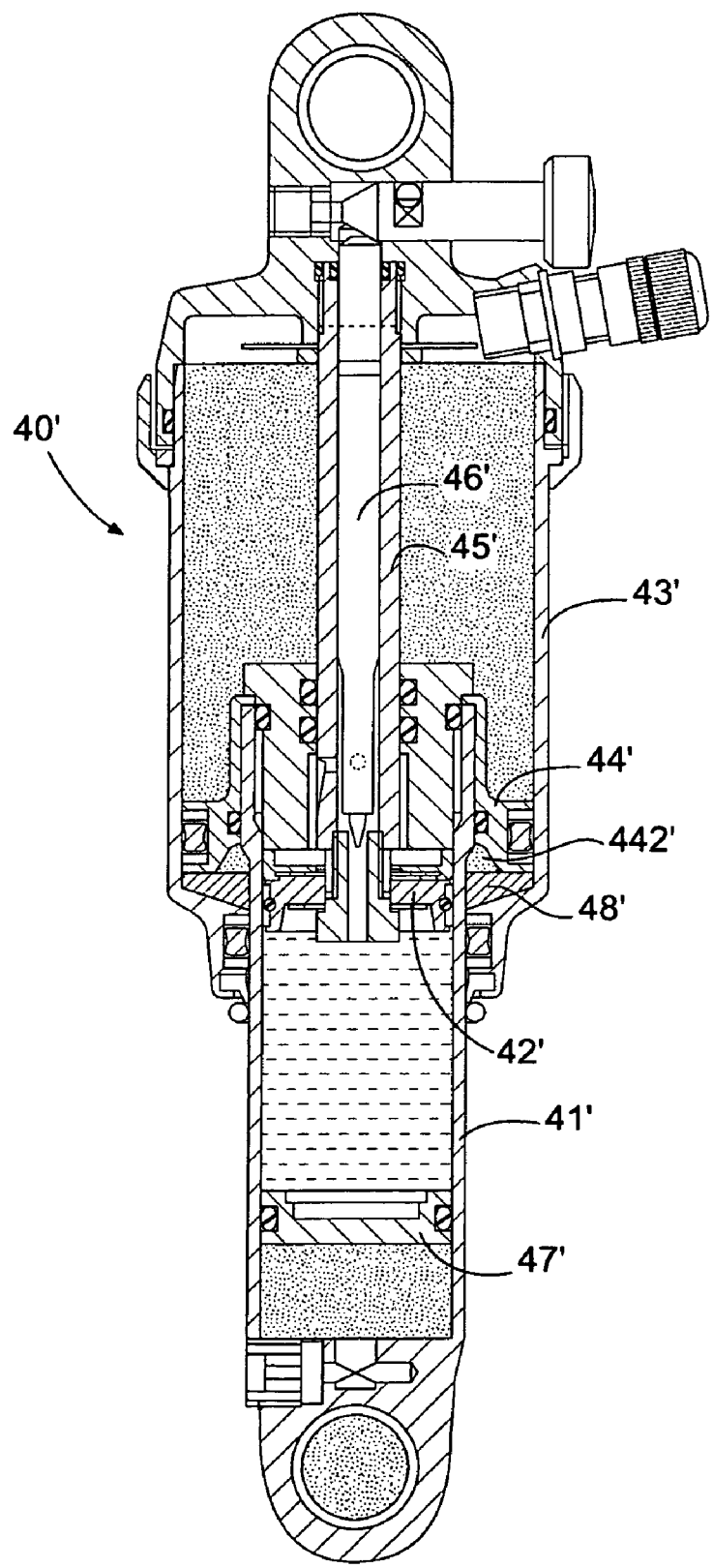
FIG. 11 is a composite, sectional drawing of a shock absorber of the second preferred embodiment of the present invention.

As shown in FIG. 11, the shock absorber 40' may include a main cylinder 41', a main piston 42' fitting inside the main cylinder 41', an auxiliary cylinder 43' fitting outside the main cylinder 41', an auxiliary piston 44' fitting inside the auxiliary cylinder 43' and secured to the main cylinder 41', a piston rod 45' connected between the main piston 42' and the auxiliary cylinder 43' and extending along an axis, an adjustable adjustment rod 46' passing through the inside of the piston rod 45', a restoring unit 47' that provides a rebound force for the main piston 42', and a buffer part 48' installed inside a negative gas chamber 442' of the auxiliary cylinder 43'. The buffer part 48' may include a ring made from high-grade plastic materials. When the shock absorber 40' has no-sag setting, no pedaling force will be able to generate tension on the shock absorber 40'. In addition, the above described structural parts and functions are roughly similar to those of the shock absorber of the above described embodiments as shown in FIGS. 1-9. In addition, the buffer part 48' can produce buffering effects when the rebound stroke of the shock absorber reaches or is about to reach its limit. Thus, it can extend the service life of the shock absorber.

By means of the fact that the main pivot point 11' is on or near to the resultant force line $L_R$ generated when brakes are applied to the rear wheel 600', the tensile force produced on the shock absorber 40' from the pedaling force applied by the rider sitting on the saddle may be reduced to a minimum.

Figure 12:
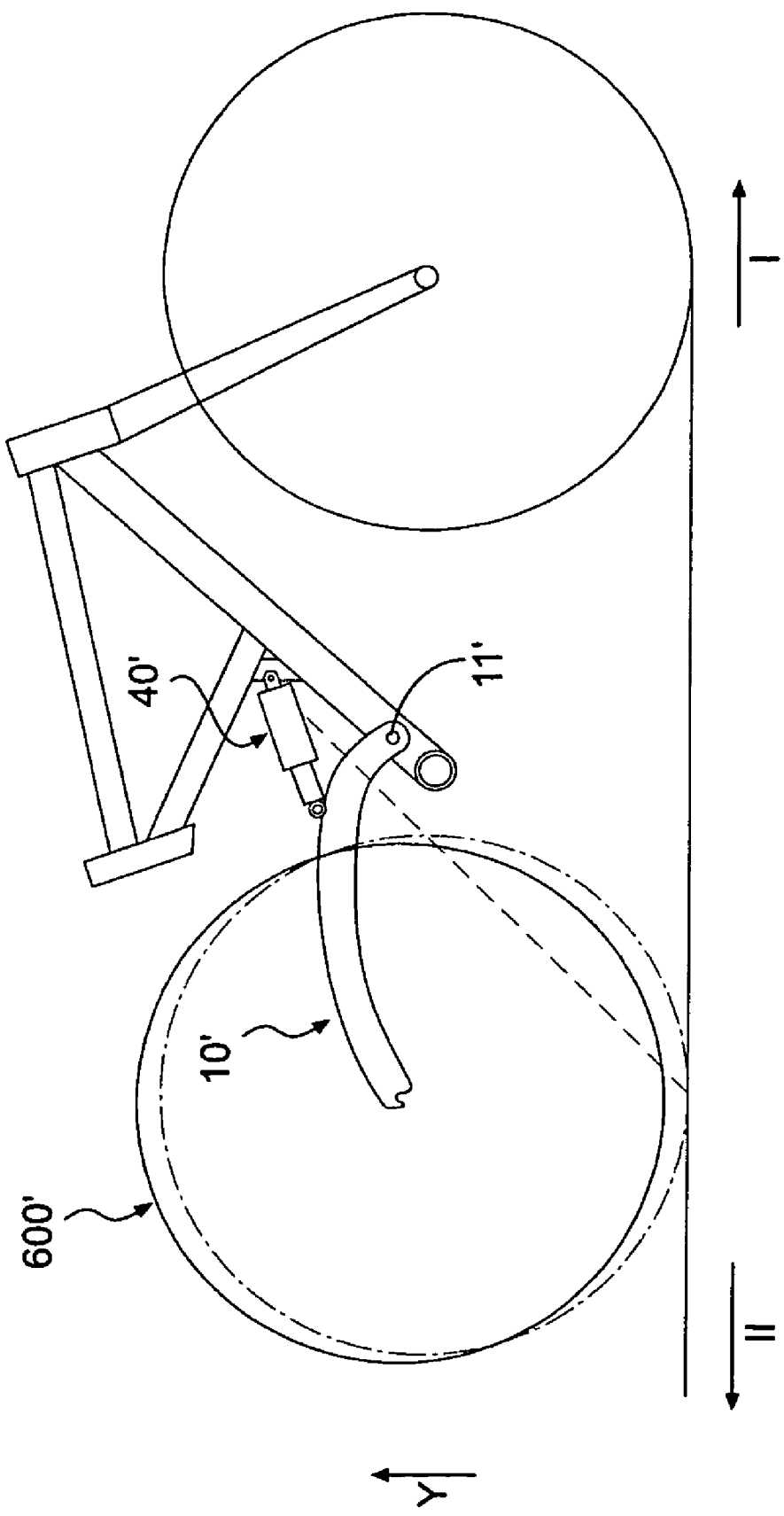
FIG. 12 is an action diagram of a rear wheel of the second preferred embodiment of the present invention.

As further shown in FIG. 12, when the bicycle encounters an uneven road surface that causes the rear wheel 600' to gradually swing in an upward direction Y, the rear triangular frame 10' undergoes, with the main pivot point 11' as the center of revolution, a revolving shift from the rear direction II towards the front direction I (a clockwise direction). In addition, by means of the placement of the shock absorber 40', one can achieve the effects of flow restrictions and buffering (such as described in the same shock absorber action of the previous embodiments).

The shock absorber 40' may also be applied to the rear suspension system 100 of the embodiments shown in FIGS. 4 and 5. The shock absorber 40 of the previous embodiments can be applied to the rear suspension system 100' of the embodiment shown in FIG. 10.

Figure 13:
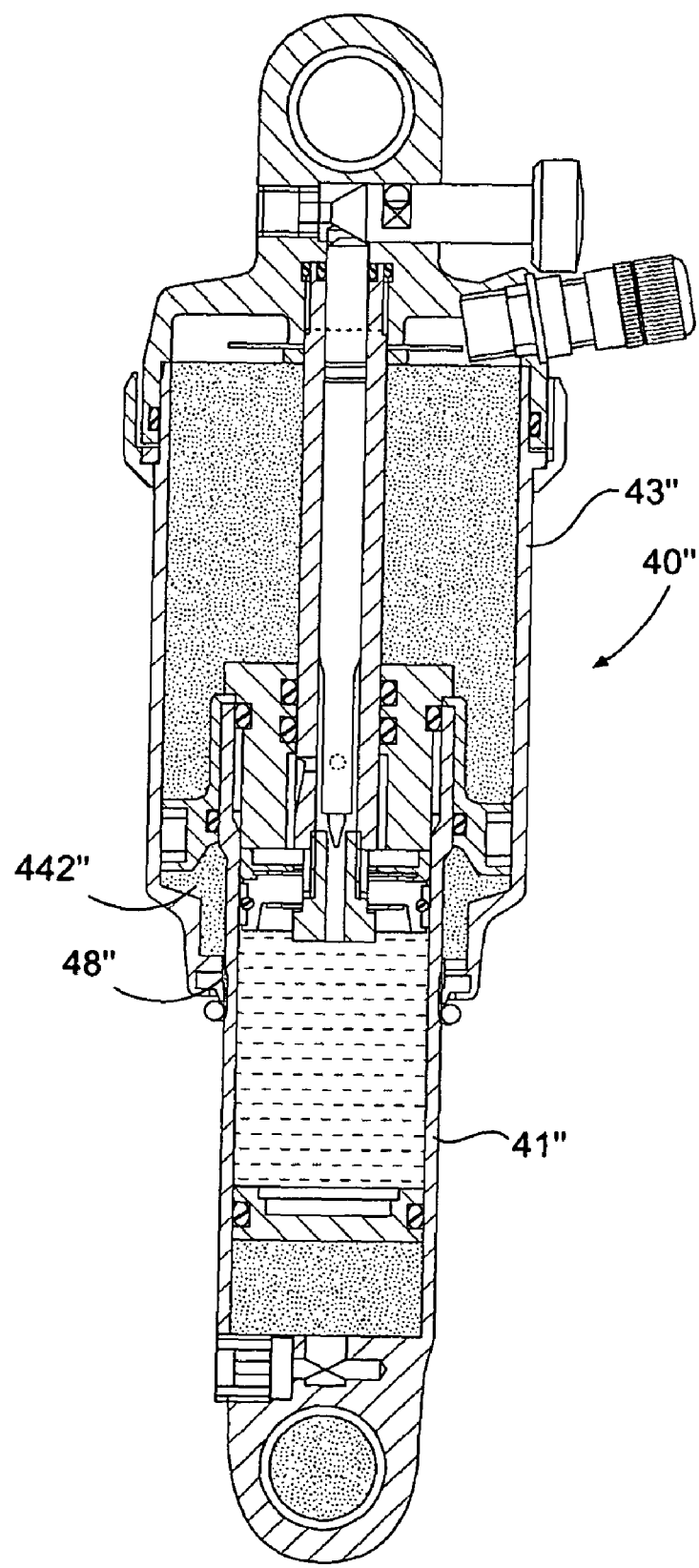
FIG. 13 is a composite, sectional diagram of a shock absorber of the third preferred embodiment of the present invention.

As shown in FIG. 13, the shock absorber 40'' according to another embodiment of the present disclosure is roughly the same as that of the previous embodiments. In the previous embodiments, the shock absorber 40 is provided with a negative gas chamber 442, the gas pressure in which is low. In the shock absorber 40'' as shown in FIG. 13, the pressure of the negative gas chamber 442'' is substantially equal to the external pressure (atmosphere pressure), and the place where the main cylinder 41'' is connected to the auxiliary cylinder 43'' is provided with a plurality of conducting channels 48''', and by means of the conducting channels 48''', the negative gas chamber 442'' can connect to the outside.

The above descriptions are only preferred embodiments of the present invention and should not be used to limit the scope of present invention embodiments. That is, any equivalent changes or revisions made in accordance with the claims and description of the present invention should be regarded as within the patented scope of the present invention.

Other embodiments of the invention will be apparent to those skilled in the art from consideration of the specification and practice of the invention disclosed herein. It is intended that the specification and examples be considered as exemplary only. Thus, it should be understood that the invention is not limited to the illustrative examples in this specification. Rather, the invention is intended to cover all modifications and variations that come within the scope of the following claims and their equivalents.

What is claimed is:

1. A suspension system comprising:
   a front frame connected to a front wheel;
   a shock absorber pivotally connected to the front frame and having a preset pressure, wherein the shock absorber is adjustable to set the preset pressure;
   a rear frame connected to a rear wheel supported by a ground contact point, and structurally configured to maintain an instantaneous center point of movement of the rear frame relative to the front frame within an angle range of about 45°±15° relative to the ground contact point when the rear frame moves relative to the front frame;
   a drive unit having a crankshaft mounted directly to the front frame;
   wherein the front and rear frames are arranged to guide a virtual pivot point, which represents a rotating center of a center point of the rear wheel when the rear wheel moves upwardly relative to the front frame, to move from a first position, which is located rearward of a center of the crankshaft, to a second position that is rearwardly spaced away from the first position when the rear wheel moves away from a ground surface.

2. The suspension system of claim 1, wherein the instantaneous center point of movement comprises a center point of rotation of the rear frame relative to the front frame, and the front and rear frames are connected together at a plurality of rotation axes that define the instantaneous center point of rotation.

3. The suspension system of claim 1, wherein the front and rear frames are connected together at a first rotation axis, a second rotation axis, a third rotation axis, and a fourth rotation axis, and the instantaneous center point of movement of the rear frame relative to the front frame is substantially aligned with an intersection point between a first line, which extends through the first rotation axis and the second rotation axis, and a second line, which extends through the third rotation axis and the fourth rotation axis.

4. The suspension system of claim 3, wherein the first rotation axis and the second rotation axis connect a lower connecting bar of the rear frame to the front frame.

5. The suspension system of claim 3, wherein the third rotation axis and the fourth rotation axis connect an upper connecting bar of the rear frame to the front frame.

6. The suspension system of claim 1, further comprising a chainwheel of the drive unit, and wherein the rear frame is configured to substantially align movement of the virtual pivot point relative to a line extending between the center point of the rear wheel and a tangent point of the chainwheel.

7. A rear suspension system for a bicycle having a frame supported by a front wheel comprising:
   a shock absorber connected to the front frame; and
   a rear frame supported by a rear wheel and connected to the front frame of the bicycle at a plurality of pivot points arranged to maintain a pivot of the rear frame relative to the front frame within an angle range of about 45°±15° with respect to a ground surface, where the angle range has a vertex at a rear wheel ground contact point;
   a drive unit having a crankshaft mounted directly to the front frame;
   wherein the front and rear frames are arranged to guide a virtual pivot point, which represents a rotating center of a center point of the rear wheel when the rear wheel moves upwardly relative to the front frame, to move from a first position, which is located rearward of a center of the crankshaft of the drive unit, to a second position that is rearwardly spaced away from the first position when the rear wheel moves away from a ground surface.

8. The rear suspension system of claim 7, wherein the rear frame includes a lower connecting bar and an upper connecting bar, and the plurality of pivot points include first and second pivot points between the lower connecting bar and the front frame, and third and fourth pivot points between the upper connecting bar and the front frame.

9. The rear suspension system of claim 7, wherein the shock absorber is provided with a preset pressure.

10. The rear suspension system of claim 7, further comprising:
    a chainwheel assembly having at least one sprocket mounted on the front frame, the chainwheel assembly having a virtual intermediate circle concentric to the at least one sprocket, the virtual intermediate circle located at an intermediate position of the at least one sprocket, and having an average diameter substantially equal to a diameter of the at least one sprocket; and
    wherein the rear frame is configured to guide a movement of the virtual pivot point along a path substantially aligned with a tangent line extending between a center point of the rear wheel and a tangent point on the virtual intermediate circle.

11. The rear suspension assembly of claim 10, wherein the chainwheel assembly includes three sprockets, and the virtual intermediate circle is substantially coincident with an outer circumference of the intermediate sprocket.

12. The rear suspension assembly of claim 10, wherein the chainwheel assembly includes two sprockets, and the virtual intermediate circle is substantially coincident with an intermediate circle between the two sprockets.

13. The bicycle assembly according to claim 10, wherein the chainwheel assembly includes a sprocket, the virtual intermediate circle is substantially coincident with an outer circumference of the sprocket.

* * * * *